(12) United States Patent
Martin (10) Patent No.: US 8,107,947 B1
(45) Date of Patent: Jan. 31, 2012

(54) SYSTEMS AND METHODS FOR ADJUSTING THE VOLUME OF A REMOTE PUSH-TO-TALK DEVICE

(75) Inventor: Geoffrey Martin, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 391 days.

(21) Appl. No.: 12/490,665

(22) Filed: Jun. 24, 2009

(51) Int. Cl.
*H04M 3/00* (2006.01)
*H04K 3/00* (2006.01)
(52) U.S. Cl. ........................ 455/420; 455/518
(58) Field of Classification Search .......... 455/418–420, 455/355, 518
See application file for complete search history.

(56) References Cited

U.S. PATENT DOCUMENTS

| 5,579,238 | A | 11/1996 | Krugman |
| 5,828,363 | A | 10/1998 | Yaniger |
| 6,125,343 | A | 9/2000 | Schuster |
| 6,351,639 | B1 * | 2/2002 | Motohashi ................ 455/420 |
| 7,123,241 | B2 | 10/2006 | Bathiche |
| 7,408,890 | B1 | 8/2008 | Doran |
| 7,421,270 | B2 * | 9/2008 | Serafat et al. ............... 455/419 |
| 7,929,712 | B2 * | 4/2011 | Katayama ................... 381/104 |
| 2006/0098591 | A1 | 5/2006 | Katou |
| 2009/0020343 | A1 | 1/2009 | Rothkopf |

OTHER PUBLICATIONS

Open Mobile Alliance, "Push to talk over Cellular (PoC)—Architecture," Feb. 26, 2008.
H. Schluzrinne et al., "RTP: A Transport Protocol for Real-Time Applications," Request for Comments 3550, Jul. 2003.
J. Rosenberg et al., "SIP: Session Initiation Protocol," Request for Comments 3261, Jun. 2002.

* cited by examiner

*Primary Examiner* — Lee Nguyen (57) ABSTRACT

The present invention provides systems and methods for controlling the volume of a remote communication terminal (RCT) based on the amount of force asserted on the session button of an originating communication terminal (OCT). The OCT may include a force-sensor that detects the force exerted on the session button and provides an output corresponding with the detected level of force. While the force is being exerted on the session button, the OCT receives voice from the user and transmits a representation of the voice via the communication interface for receipt by the RCT and for playout of the voice by the RCT. The OCT includes with the transmitted representation of the voice a playout-volume directive that corresponds with the output from the force-sensor, and causes the RCT to play out the voice at a volume level corresponding with the detected level of force.

20 Claims, 5 Drawing Sheets

SYSTEMS AND METHODS FOR ADJUSTING THE VOLUME OF A REMOTE PUSH-TO-TALK DEVICE

BACKGROUND

Many people use communication terminals, such as cell phones and personal digital assistants, to communicate with cellular wireless networks, which typically provide communication services such as voice, text messaging, and packet-data communication to these communication terminals. The communication terminals and networks typically communicate with each other over a radio frequency (RF) air interface according to a wireless protocol such as 1xRTT CDMA, EV-DO, WiMax, iDEN, 802.11, etc.

For example, communication terminals typically conduct these wireless communications with one or more base transceiver stations (BTSs), each of which send communications to and receive communications from communication terminals over the air interface. Each BTS in turn is communicatively connected with an entity known as a base station controller (BSC), which (a) controls one or more BTSs and (b) acts as a conduit between the BTS(s) and one or more switches or gateways, such as a packet data serving node (PDSN), which may in turn interface with one or more signaling and/or transport networks. As such, communication terminals can typically communicate with one or more endpoints over the one or more signaling and/or transport networks from inside one or more coverage areas (such as cells and/or sectors) of one or more BTSs, via the BTS(s), a BSC, and a PDSN.

Communication terminals may also conduct wireless communication using other means. For example, a communication terminal may communicate with a wireless device, such as a wireless router, using a protocol such as 802.11. The wireless router in turn may interface with one or more signaling and/or transport networks. As yet another example, a communication terminal may engage in direct communication with another communication terminal using peer-to-peer communication.

OVERVIEW

A communication terminal may engage in packet-data communication with another communication terminal over one or more packet-data networks. One popular form of packet-data communication is push-to-talk (PTT), in which the communication terminal emulates the functionality of a walkie-talkie radio. PTT equipped communication terminals typically have a session button that allows a user to engage in a PTT session. While the user holds down the session button, the communication terminal typically sends voice data to a PTT server, which in turn relays the voice data to one or more recipient terminals for playout.

A user communicating using PTT may want to increase the likelihood that the person to whom the user is speaking can hear everything that the user is saying (for example, if the user is the recipient's supervisor, or if the recipient is in a loud area). Accordingly, the present invention provides systems and methods for controlling the volume of a remote communication terminal (RCT) based on the amount of force asserted on the session button of an originating communication terminal (OCT). For example, the OCT may include a force-sensor that detects a level of force exerted on the session button and provides an output corresponding with the detected level of force. While force is being exerted on the session button, the OCT receives voice from the user via a voice communication interface, and transmits a representation of the voice via the communication interface for receipt by the RCT and for playout of the voice by the RCT. The OCT includes with the transmitted representation of the voice a playout-volume directive that corresponds with the output from the force-sensor. The playout-volume directive causes the RCT to play out the voice at a volume level corresponding with the detected level of force.

The OCT may send the representation of the voice and the playout-volume directive directly to the RCT, which would use the playout-volume directive to play out the representation of the voice at the appropriate level. The OCT may alternatively send the representation of the voice and the playout-volume directive to an intermediate device, such as a PTT server. The PTT server may then forward the representation of the voice and the playout-volume directive to the RCT. Alternatively, the PTT server may use the playout-volume directive to modify the representation of the voice to the appropriate playout level. The PTT server may then relay the modified representation of the voice to the RCT for play out.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

Various embodiments are described herein with reference to the following drawings, wherein like numerals denote like entities.

DETAILED DESCRIPTION

Figure 1:
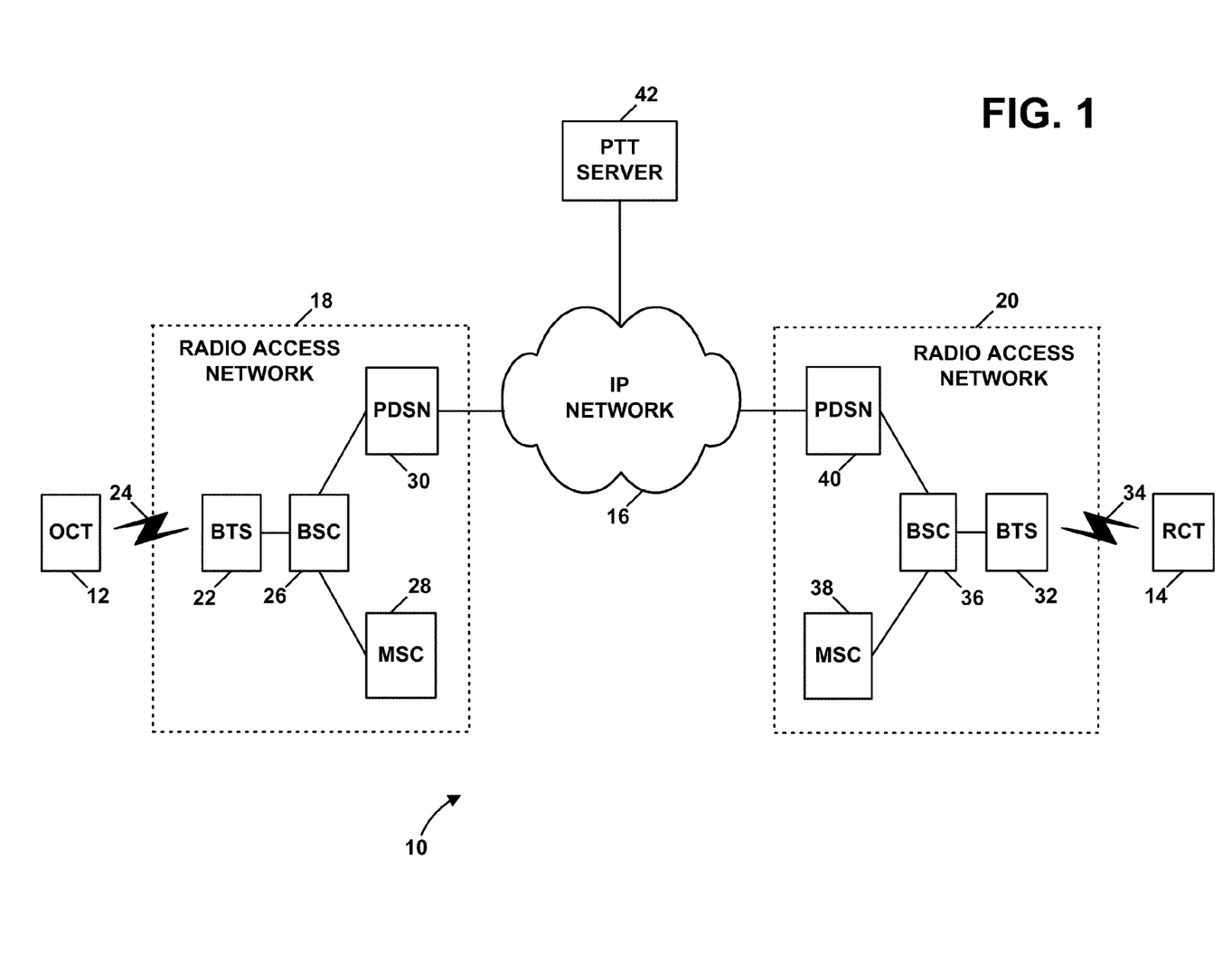
FIG. 1 is a simplified block diagram of a communication system, in accordance with an embodiment of the invention.

Referring to the drawings, FIG. 1 illustrates a wireless communications system 10 in which an embodiment of the invention may be employed. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location.

System 10 may include a number of communication terminals (CTs), such as OCT 12 and RCT 14, for instance. Each of OCT 12 and RCT 14 may be a PTT-equipped cellular telephone, and may be linked by a radio access network with an IP network 16. As shown by way of example, OCT 12 is linked by a first radio access network 18 with the IP network 16, and RCT 14 is linked by a second radio access network 20 with the IP network 16. Alternatively, both OCT 12 and RCT 14 can be linked to the IP network by a common radio access network. Other alternatives are possible as well. Further, other entities may be coupled with (or may sit as nodes on) IP network 16. One such entity may include a PTT server 42, that functions to establish and carry PTT sessions between OCT 12 and RCT 14 and/or between other stations linked with IP network 16.

Each radio access network provides wireless connectivity with the IP network and can take any of a variety of forms. By way of example, radio access network 18 may include a BTS 22 that can communicate with OCT 12 over an air interface 24. BTS 22 may then be coupled with a BSC 26, which may in turn be coupled with an MSC 28 and with a PDSN 30 or other gateway to the IP network 16. Similarly, radio access network 20 may include a BTS 32 that can communicate with RCT 14 over an air interface 34. BTS 32 may then be coupled with a BSC 36, which may in turn be coupled with an MSC 38 and with a PDSN 40 or other gateway to the IP network 16.

As another example, either or both of the radio access networks could comprise a base station that itself functions as a gateway with the IP network, without use of a PDSN or other gateway to the network. And as another example, OCT 12 and RCT 14 could communicate at least in part via a common radio access network, such as through a common PDSN, a common BSC and/or a common BTS. Other examples are also possible.

As a general matter, OCT 12 and RCT 14 may engage in packet-data communication over IP network 16 by establishing a radio link over an air interface, establishing a data link with a PDSN or other gateway, and sending or receiving packet-data via those links. For instance, OCT 12 may request a traffic channel on air interface 24, and BSC 26 may responsively instruct OCT 12 to operate on a given traffic channel. Through that traffic channel, OCT 12 may then negotiate with PDSN 30 to obtain an IP address so that OCT 12 can engage in IP communication over IP network 16. Alternatively, OCT 12 can obtain an IP address in some other way, such as from a mobile-IP home agent (not shown). Similarly, RCT 14 may acquire a traffic channel on air interface 34 and may negotiate with PDSN 40 or otherwise obtain an IP address, so that it too can engage in IP communication over IP network 16. OCT 12 and RCT 14 may then communicate with each other or with other entities on network 16 via their respective radio-links and their respective network-links.

OCT 12 and RCT 14 may be equipped to communicate real-time media, such as voice and/or video. For instance, the CTs may include one or more media input mechanisms, such as a microphone or video camera, and may further include logic to digitize, encode and packetize media received through those mechanisms. Additionally, the CTs may include logic to encapsulate the resulting packets with industry standard Real Time Protocol (RTP) headers and to transmit the resulting RTP packets in a stream to one or more designated addresses over IP network 16. Also, the CTs may include logic to send packets using RTP control protocol (RTCP). RTCP allows a CT to send session control information using an RTCP packet (e.g., an "RTCP APP" packet) to one or more recipients of an RTP stream. The RTP and RTCP standards are defined in Request For Comments (RFC) 3550.

Similarly, the CTs may include logic to receive incoming RTP packets from IP network 16, to assemble the packets in sequence, and to depacketize and decode the data carried by the packets so as to retrieve an underlying media signal. Further, the CTs may include one or more media output mechanisms, such as a speaker or video display, through which to play out the incoming media signal to a user. Additionally, the CTs may include logic to receive any incoming RTCP packets and extract and use any control information from those packets.

In order for a CT (in this example, OCT 12) to establish RTP communication with another endpoint (in this example, RCT 14), the two terminals will usually engage in setup signaling, which may take a variety of forms. For instance, according to the industry standard Session Initiation Protocol (SIP) (defined in RFC 3261), an OCT 12 may send to a server (such as PTT server 42) a SIP "INVITE" request message that designates the terminating SIP address of RCT 14. The INVITE may include a Session Description Protocol (SDP) block that characterizes the proposed session as an RTP session.

The server may then query a SIP registry to determine the IP address of RCT 14. The server may then forward the INVITE to that address. If the RCT 14 agrees to establish the session, it may then send a SIP "200 OK" message via the server to OCT 12. OCT 12 may responsively send a SIP "ACK" message via the server to RCT 14. OCT 12 and RCT 14 may then begin to communicate RTP packets with each other.

OCT 12 may also use the SIP signaling described to set up communication sessions between multiple endpoints (for example, by sending multiple SIP INVITE messages identifying different CTs), so as to allow OCT 12 to send packet-data to multiple endpoints.

Another way for two or more terminals to establish and conduct a real-time media session with each other is through PTT server 42, where PTT server 42 may function to set up respective RTP sessions ("legs") with each participating CT and to bridge together the legs so that the participants can communicate with each other.

For instance, an initiating terminal (in this example, OCT 12) may send to PTT server 42 an INVITE that requests an RTP session with one or more designated terminating terminals (in this example, RCT 14). PTT server 42 may then respond with a 200 OK to OCT 12, and OCT 12 may respond with an ACK, thus establishing an RTP leg (initiating leg) between OCT 12 and PTT server 42.

At the same time, PTT server 42 may itself send an INVITE to RCT 14 (and any other designated terminating terminal) and establish an RTP leg (terminating leg) with RCT 14. In turn, PTT server 42 may bridge together the initiating leg with each of the terminating legs, so as to allow all of the endpoints to communicate with each other.

Figure 2:
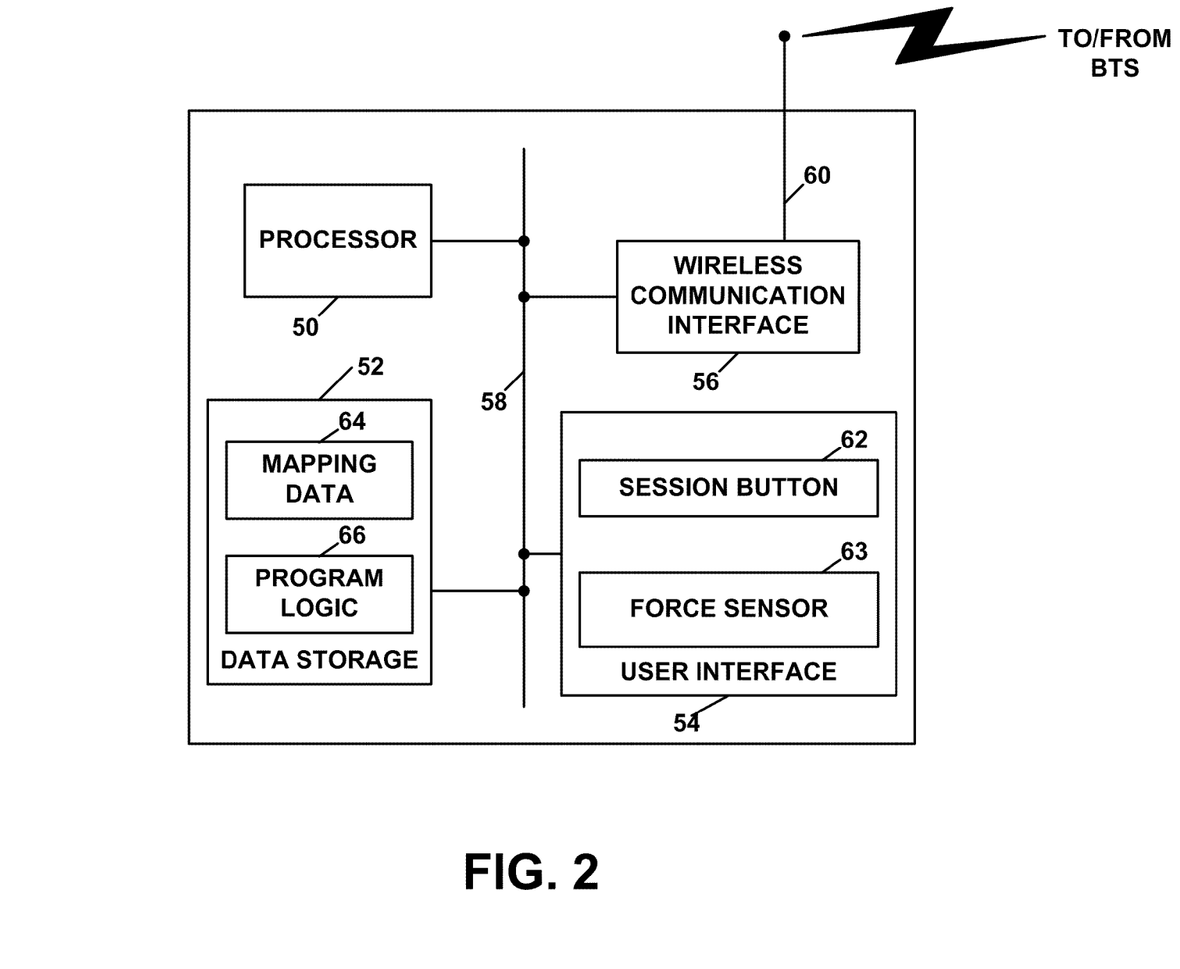
FIG. 2 is a simplified block diagram of a communication terminal, in accordance with an embodiment of the invention.

FIG. 2 is a simplified block diagram depicting the functional components of an example CT (such as OCT 12 or RCT 14). As shown in FIG. 2, the CT includes a processor 50, data storage 52, a user interface 54, and a wireless communication interface 56, all of which may be coupled together by a system bus 58.

Processor 50 may comprise one or more general-purpose processors (e.g., INTEL processors) and/or one or more specialized processors (e.g., digital signal processors and/or application-specific integrated circuits). And data storage 52 may comprise one or more volatile and/or non-volatile storage components, such as optical, magnetic, or organic storage components, and may be integrated in whole or in part with processor 50.

User interface 54 comprises input and output components to facilitate user interaction with the CT. The user interface 54 may include a keypad or other mechanism to facilitate tactile user input, such as a touch screen. In addition, the user interface may include a display, speaker or other mechanism (not shown) for presenting information and menus to a user, as well as an input mechanism (e.g., keyboard, keypad, mouse, and/or touch-sensitive display overlay) (not shown) for receiving input from a user. Also, user interface 54 may include a voice communication interface (such as a microphone, for example), for receiving voice input from a user. For PTT functionality, the user interface 54 may include a session button 62. Session button 62 may be a PTT button, and may be used to initiate a PTT session or to request the floor during a PTT session. When engaged, session button 62 may contact a force-sensor 63, which detects the level of force being exerted by the user of the CT on the session button, and generates an output signal that corresponds to the detected level of force.

Figure 2A:
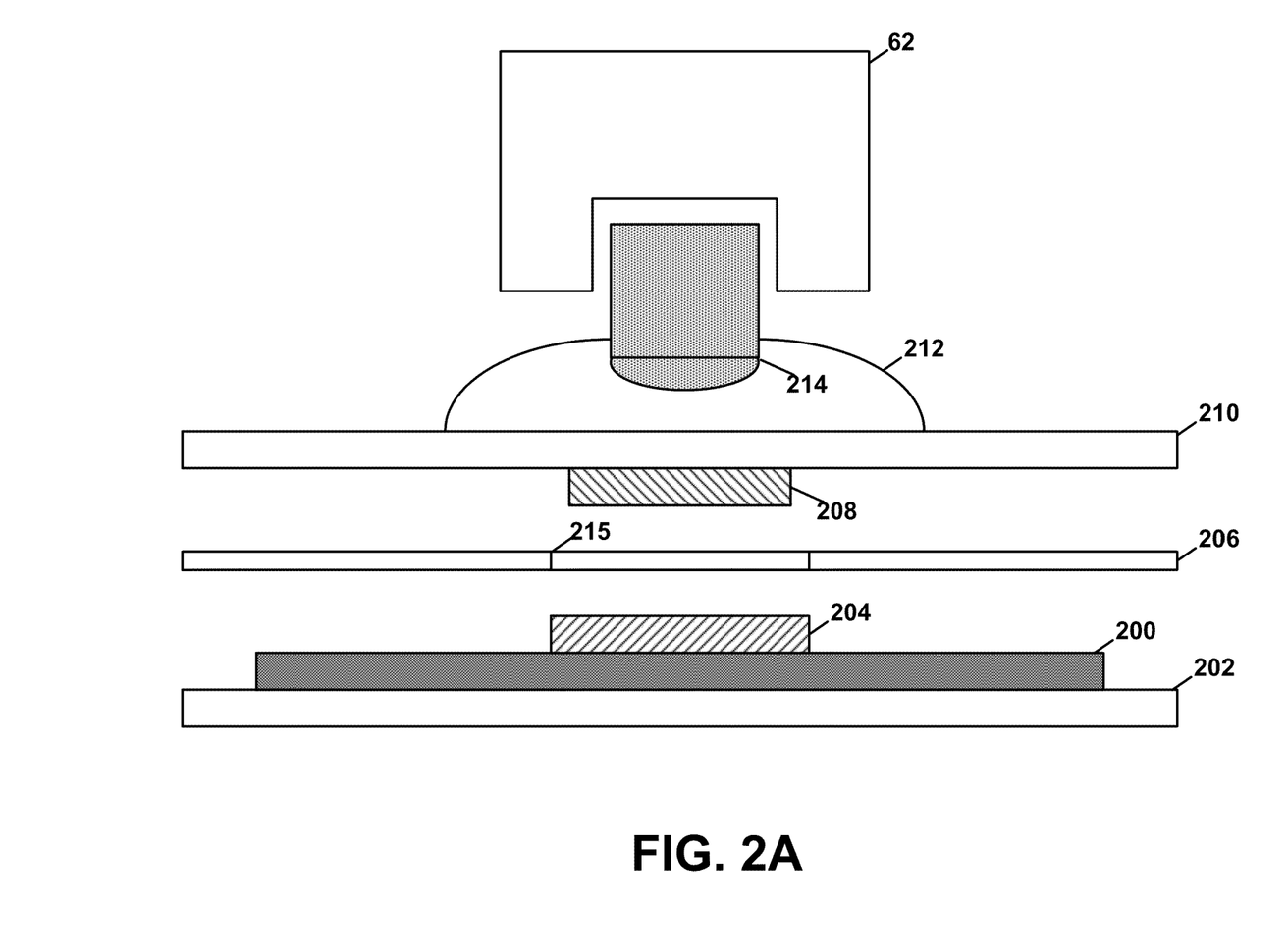
FIG. 2A is a cross-sectional diagram depicting a session button and a force sensor.

Force-sensor 63 may be any type of sensor capable of measuring levels of force. For example, force-sensor 63 may use a force-sensing resistor (FSR), such as the type disclosed in U.S. Pat. No. 7,123,241, which is hereby incorporated by reference. Other types of force-sensors may be used as well. FIG. 2A is a cross-sectional diagram depicting an embodiment of session button 62 and force-sensor 63. As shown in FIG. 2A, a conductor 200 is attached to an insulating substrate 202. An FSR 204 is situated on top of conductor 200. A spacer sheet 206 is situated above FSR 204. Above spacer sheet 206 is a conductor 208, which is attached to an insulating substrate 210. Located above insulating substrate 210 is an elastomeric dome switch 212, which is in turn located under session button 62. Dome switch 212 includes a plunger 214. When a user engages session button 62, dome switch 212 collapses, causing plunger 214 to engage insulating substrate 210, which in turn forces conductor 208 into contact with FSR 204 through an opening 215 in spacer sheet 206. A resistive conductive path is thereby formed between conductor 200 and conductor 208 through FSR 204. The level of resistance is based on the amount of force the user applies to session button 62. The amount of output voltage is also based on the amount of force applied on session button 62. The greater the force applied, the lower the resistance and the greater the output voltage.

Returning to FIG. 2, communication interface 56 may facilitate communication over an air interface with a respective base station. As such, the wireless communication interface may include an antenna 60 for sending and receiving signals over the air interface.

Data storage 52 may hold mapping data 64 and program logic 66. Mapping data 64 may comprise data that specifies correlations between various levels of force detected by force sensor 63 and various playout volume levels. The levels of force may be the current coming from force sensor 63, or the output voltage of force sensor 63. Other levels of force may be used as well. Mapping data 64 may be arranged as a table or as a database, although other forms of data arrangement may be used as well. The manufacturer and/or the service provider of the communication terminal may provide the values of mapping data 64. Additionally and/or alternatively, the values of mapping data 64 may be modified by the user. For example, the user may be able to use user interface 54 to modify the level(s) of force that corresponds to a specific playout-volume level.

Program logic 66 comprises machine-language instructions executable by processor 40 to carry out various functions described herein. For example, program logic 66 may include logic to convert analog sound received into user interface 54 into digital information (and vice-versa), and to encapsulate that digitized information into packet-data representative of voice (for example, into RTP packets). In addition, program logic 66 may include logic to refer to mapping data 64 to determine a playout-volume level associated with the level of force exerted on session button 62, and to specify that playout volume level (e.g., a value representative of the playout-volume level) in a playout-volume directive. And program logic 66 may include logic to specify additional information in the playout-volume directive. For example, the playout-volume directive may specify a period of time that the remote terminal should play audio at the playout-volume level indicated by the playout-volume directive. As another example, the playout-volume directive may instruct the remote terminal to play audio at the playout-volume level until another playout-volume directive is received. Other examples are possible as well.

Program logic 66 may further include logic to transmit the playout-volume directive in a variety of ways. For example, program logic 66 may include logic to transmit the playout-volume directive within the packet headers of RTP packets (e.g., within an "RTP packet header extension," which is an optional part of the RTP header). As another example, program logic 66 may include logic to transmit the playout-volume directive within RTCP control packets. As yet another example, program logic 66 may include logic to transmit the playout-volume directive within a SIP message (for example, in a SDP block of a SIP INVITE message) during session-setup or session-management signaling.

Program logic 66 may also include logic to receive packet-data representative of voice, convert the packet-data to analog sound and play the sound through user interface 54. In addition, program logic 66 may include logic to playout the sound at a volume level identified by the playout-volume directive.

Figure 3:
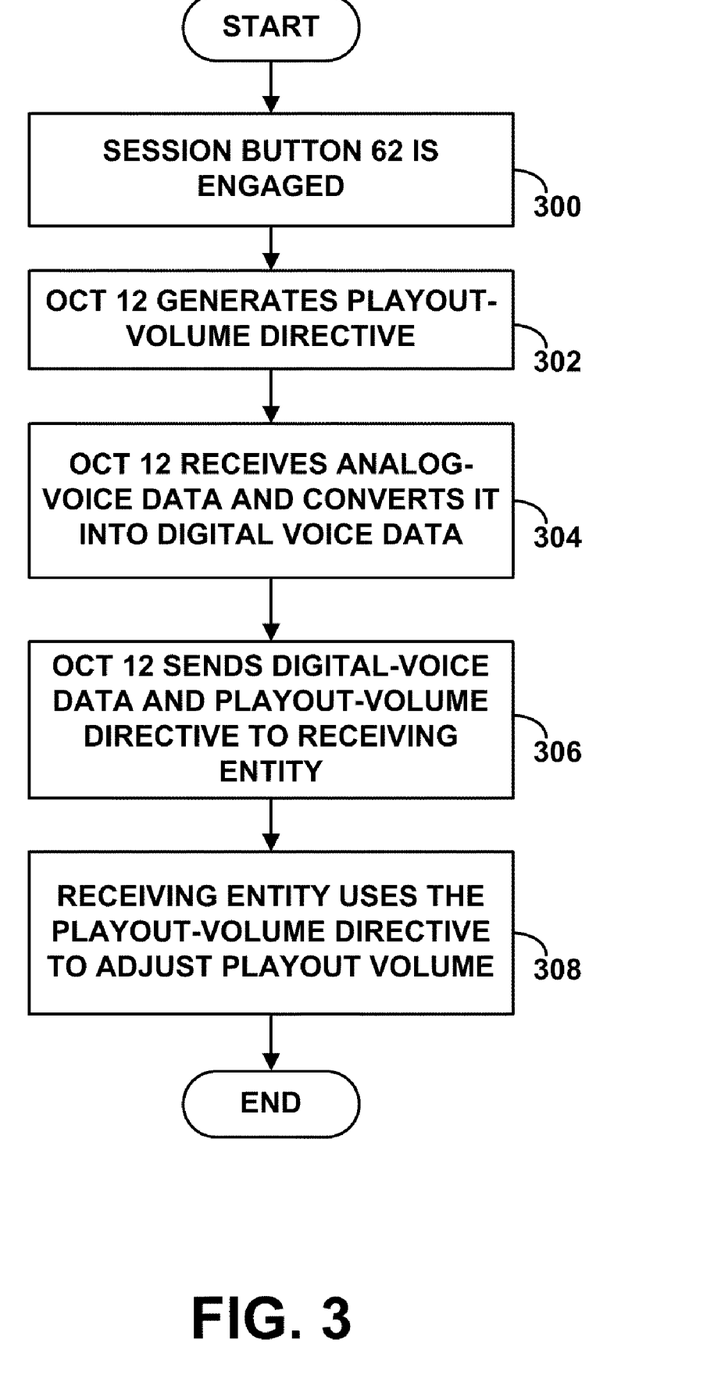
FIG. 3 is a flow chart of a method, in accordance with an embodiment of the invention.

FIG. 3 is a flow chart depicting a set of functions that can be carried out in accordance with an embodiment of the invention. Generally, FIG. 3 depicts a method of an OCT sending voice data and a playout-volume directive to a receiving entity, and that receiving entity using the playout-volume directive to adjust the playout volume of the voice data.

As shown in FIG. 3, at step 300, the user of OCT 12 engages session button 62 in order to communicate with the user of RCT 14. The user may be engaging session button 62 to initiate a PTT session between OCT 12 and RCT 14 (and possibly other receiving CTs), or to request the floor in an existing PTT session with RCT 14. As discussed above, while session button 62 is engaged, a resistive conductive path is formed between conductors 200 and 208 through FSR 204, allowing force-sensor 63 to detect the level of force exerted by the user on session button 62.

At step 302, OCT 12 refers to mapping data 64 to determine a playout volume that corresponds to the level of force exerted on session button 62, and generates a playout-volume directive based on the determined playout volume. At step 304, while session button 62 is engaged, analog voice is received into user input 54 of OCT 12, and converted by OCT 12 into digital-voice data.

At step 306, OCT 12 sends the digital-voice data and the playout-volume directive to a receiving entity. OCT 12 may encapsulate the digital-voice data into RTP packets, include the playout-volume directive in the RTP packet header (for example, in the RTP packet header extension) of one or more of the RTP packets, and send the RTP packets to the receiving entity. Additionally and/or alternatively, OCT 12 may encapsulate the digital-voice data into RTP packets, generate an RTCP control packet, and include the playout-volume directive in the RTCP control packet. OCT 12 may then send the RTCP control packet and the RTP packets to the receiving entity. As yet another example, OCT 12 may the send playout-volume directive to the receiving entity during session setup signaling (for example, in a SDP block of a SIP INVITE message). Further, while session setup signaling is occurring, OCT 12 may encapsulate the digital-voice data into RTP packets, buffer those packets, and send them to the receiving entity when the session setup signaling is completed. Other examples are possible as well.

At step 308, the receiving entity receives the digital-voice data and the playout-volume directive and uses the playout-volume directive to adjust the playout volume of the voice provided by the RTP packets. The receiving entity discussed above may be RCT 14, PTT server 42, or one or more additional entities capable of communicating over IP network 16. If the receiving entity is RCT 14, RCT 14 may receive the RTP packets, convert the packets to analog sound, and play the sound at the volume level specified in the playout-volume directive.

If the receiving entity is PTT server 42 (for example if PTT server 42 is bridging together an initiating leg between itself and OCT 12 and a terminating leg between itself and RCT 14), PTT server 42 could simply forward the digital-voice data and the playout-volume directive to RCT 14, and allow RCT 14 to convert the digital-voice data into analog sound and play the sound at the volume level specified in the playout-volume directive. Alternatively, PTT server 42 could modify the digital-voice data according to the playout-volume directive and forward those modified packets to RCT 14 for playout. For example, PTT server 42 could convert the digital-voice data into analog data, and use the playout-volume directive to change the amplitude of the analog data by an amount specified in the playout-volume directive. PTT server 42 could then convert the modified analog data into digital data, encapsulate the digital data into RTP packets, and send those RTP packets to RCT 14 for playout.

The method described in FIG. 3 could also be used to allow the user of OCT 12 to cause certain parts of the conversation to have a louder playout volume than others. For example, while speaking, the user may change the level of force exerted on session button 62, causing force sensor 63 to detect a series of levels of force exerted by the user during the conversation. OCT 12 may thus generate a series of playout-volume directives corresponding with the detected series of levels of force and include the series of playout-volume directives with the packet-data representation of the voice.

For example, assume that at time T1 the user exerts a first amount of force to session button 62, and at time T2 the user exerts a second amount of force to session button 62. At time T1, OCT 12 refers to mapping data 64 to determine a playout volume that corresponds to the level of force exerted on session button 62 at time T1, generate a playout-volume directive based on the determined playout volume, and send the playout-volume directive to the remote entity. At time T2, OCT 12 refers to mapping data 64 to determine a playout volume that corresponds to the level of force exerted on session button 62 at time T2, generates a playout-volume directive based on the determined playout volume, and sends the playout-volume directive to the remote entity.

Figure 4:
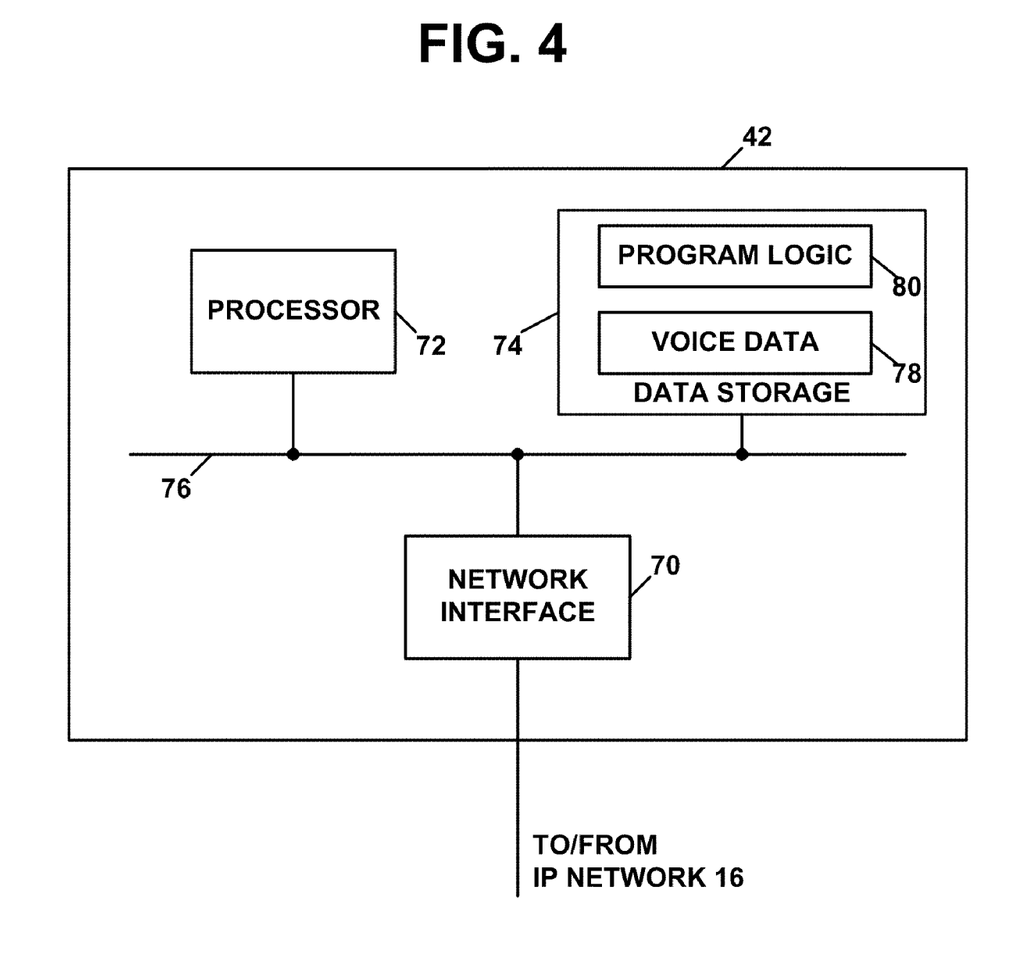
FIG. 4 is a simplified block diagram of a PTT server, in accordance an embodiment of the invention.

FIG. 4 is a simplified block diagram depicting the functional components of PTT server 42. As shown, the example PTT server 42 includes a network interface 70, a processor 72, and data storage 74, all of which may be coupled together by a system bus 76. Network interface unit 70 functions to provide connectivity with IP network 16. As such, network interface unit 70 may receive packets from the IP network and may route packets over the IP network to designated IP addresses.

Processor 72 may comprise one or more general-purpose processors (e.g., INTEL processors) and/or one or more specialized processors (e.g., digital signal processors and/or application-specific integrated circuits). And data storage 74 may comprise one or more volatile and/or non-volatile storage components, such as optical, magnetic, or organic storage components, and may be integrated in whole or in part with processor 72.

Data storage 74 may hold voice data 78 and program logic 80. Voice data 78 may include packet-data representative of voice received from OCT 12. Program logic 80 may comprise machine language instructions and/or other logic executable by processor 72 to carry out various functions described herein. For example, program logic 80 may include logic to establish PTT sessions between OCT 12 and RCT 14. This logic can vary depending on the type of links and protocols that are employed. For instance, the logic might function to communicate according to RTP protocol (or any other protocol), and to setup the PTT session using SIP (or any other protocol). Program logic 80 may include logic to establish a PTT session between OCT 12 and RCT 14 in which OCT 12 and RCT 14 communicate RTP packets directly with each other. Additionally and/or alternatively, program logic 80 may include logic to establish an initiating leg between PTT server 42 and OCT 12, and a terminating leg between PTT server 42 and RCT 14 (and any other designated terminating terminal), and to bridge the initiating leg with each of the terminating legs.

Additionally, program logic 80 may include logic to modify the packet-data received from OCT 12 according to the playout-volume directive prior to relaying it to RCT 14. For example, program logic 80 may include logic to convert the digital-voice data into analog data, and program logic 80 may further include logic to use the playout-volume directive to modify the amplitude of the analog data. Program logic 80 may further include logic to then convert the modified analog data into digital data, encapsulate the digital data into RTP packets, and send those RTP packets to RCT 14.

Embodiments of the invention have been described above. Those of ordinary skill in the art will appreciate, however, that modifications may be made while remaining within the scope of the invention as defined by the claims.

What is claimed is:

1. A communication terminal operable by a user to engage in voice communication with a remote device, the terminal comprising:
   a communication interface through which the terminal engages in a communication session with the remote device;
   a voice communication interface;
   a session button arranged to be pressed by the user; and
   a force-sensor for detecting a level of force being exerted by the user on the session button and for providing an output corresponding with the detected level of force,
   wherein, while the button is being pressed by the user, the terminal receives voice from the user via the voice communication interface and transmits a representation of the voice via the communication interface for receipt by the remote device and for playout of the voice by the remote device, and
   wherein the terminal includes with the transmitted representation of the voice a playout-volume directive corresponding with the output from the force-sensor, to cause the remote device to play out the voice at a volume level corresponding with the detected level of force.

2. The communication terminal of claim 1, wherein the communication session is a push-to-talk (PTT) session, and the session button is a PTT button, and wherein the terminal transmits the representation of the voice via the communication interface for receipt by the remote device by transmitting the representation of the voice via the communication interface via a radio access network to a PTT server for transmission of the representation of the voice in turn from the PTT server to the remote device.

3. The communication terminal of claim 2, wherein the terminal is a PTT-equipped cellular telephone.

4. A system comprising the communication terminal of claim 2 and the PTT server, wherein the PTT server receives the representation of the voice and the playout-volume directive and responsively modifies the representation of the voice to represent voice at a volume level corresponding with the playout-volume directive, so that the remote device receives the modified representation of the voice and plays out the voice at the volume level.

5. A system comprising the communication terminal of claim 1 and the remote device, wherein the remote device receives the representation of the voice with the playout-volume directive and responsively plays out the voice at a volume level according to the playout-volume directive.

6. The communication terminal of claim 1, further comprising:
data storage; and
mapping data stored in the data storage and specifying correlations between various levels of force and various playout volume levels,
wherein the terminal refers to the mapping data to determine a playout volume level corresponding with the detected level of force and generates the playout-volume directive corresponding with the determined playout volume level.

7. The communication terminal of claim 1, further comprising:
data storage; and
mapping data stored in the data storage and specifying correlations between various levels of force and various playout-volume directives,
wherein the terminal refers to the mapping data to determine the playout-volume directive to include with the transmitted representation of the voice.

8. The communication terminal of claim 1,
wherein as the terminal receives voice from the user and transmits the representation of the voice, the force-sensor detects a series of levels of force being exerted by the user on the session button, and the terminal responsively includes with the transmitted representation of the voice a corresponding series of playout-volume directives, to cause the remote device to play out the voice at volume levels corresponding with the detected series of levels of force.

9. The communication terminal of claim 1, wherein the representation of the voice comprises a real-time packet-based media stream, and wherein the terminal includes the playout-volume directive in at least one packet header of the real-time packet-based media stream.

10. The communication terminal of claim 9, wherein the real-time packet-based media stream comprises a Realtime-Transport Protocol (RTP) media stream, and wherein the packet header comprises an RTP header.

11. A push-to-talk (PTT) communication terminal operable by a user to engage in PTT communication, the terminal comprising:
a wireless communication interface through which the terminal engages in a PTT communication session with at least one remote device via a radio access network and a PTT server;
a voice communication interface;
a PTT button arranged to be pressed by the user to invoke PTT communication; and
a force-sensor for detecting a level of force being exerted by the user on the PTT button and for providing an output corresponding with the detected level of force,
wherein, while the PTT button is being pressed by the user, the terminal receives voice from the user via the voice communication interface and transmits a representation of the voice via the wireless communication interface to a PTT server for transmission of the representation of the voice in turn from the PTT server to the remote device and for playout of the voice at the remote device, and
wherein the terminal includes with the transmitted representation of voice a playout-volume directive based on the output from the force-sensor, to cause the remote device to play out the voice at a volume level based on the detected level of force.

12. The PTT communication terminal of claim 11, wherein the PTT button comprises a PTT floor control button that, upon being pressed, requests a floor of the PTT communication session.

13. A method comprising:
detecting in portable communication terminal a level of force being exerted by a user on a session button of the terminal while the terminal is receiving voice from the user;
generating in the terminal a representation of the received voice and transmitting the representation from the terminal into a network for transmission of the representation in turn via the network to a remote device and for playout of the voice at the remote device; and
generating in the terminal a playout-volume directive corresponding with the detected level of force, and including the playout-volume directive with the transmitted representation, to cause the remote device to play out the voice at a volume level corresponding with the detected level of force.

14. The method of claim 13, further comprising:
receiving at the remote device the transmitted representation together with the playout-volume directive; and
responsive to the playout-volume directive, the remote device playing out the voice at a volume level corresponding with the playout-volume directive and thus corresponding with the detected level of force.

15. The method of claim 13, further comprising:
detecting a series of levels of force being exerted by the user on the session button while the terminal is receiving voice from the user; and
generating in the terminal a series of playout-volume directives corresponding with the detected series of levels of force, and including the series of playout-volume directives with the transmitted representation, to cause the remote device to play out the voice at a series of volume levels corresponding with the detected series of levels of force.

16. The method of claim 15, further comprising:
receiving at the remote device the transmitted representation together with the detected series of playout-volume directives; and
responsive to the series of playout-volume directives, the remote device playing out the voice at a series of volume levels corresponding with the series of playout-volume directives and thus corresponding with the detected series of levels of force.

17. The method of claim 13,
wherein the session button comprises a push-to-talk (PTT) button usable to request floor in a PTT session, and
wherein transmitting the representation from the terminal into a network for transmission of the representation in turn via the network to a remote device and for playout of the voice at the remote device comprises transmitting the representation from the terminal to a PTT server in the network, for transmission of the representation in turn from the PTT server to the remote device.

18. The method of claim 13, further comprising:
maintaining in data storage of the terminal a set of mapping data that specifies correlations between various levels of force and various playout-volumes,
wherein generating in the terminal a playout-volume directive corresponding with the detected level of force comprises referring to the mapping data.

19. The method of claim 13, wherein the representation of the voice comprises a real-time packet-based media stream, and wherein including the playout-volume directive with the transmitted representation comprises including the playout-volume directive in at least one packet header of the real-time packet-based media stream.

20. The method of claim 19, wherein the real-time packet-based media stream comprises a Realtime-Transport Protocol (RTP) media stream, and wherein the packet header comprises an RTP header.

* * * * *